US012625359B2

(12) United States Patent
Sieckmann et al.

(10) Patent No.: US 12,625,359 B2
(45) Date of Patent: May 12, 2026

(54) METHOD FOR PROVIDING POSITION INFORMATION FOR RETRIEVING A TARGET POSITION IN A MICROSCOPIC SAMPLE, METHOD FOR EXAMINING AND/OR PROCESSING SUCH A TARGET POSITION AND MEANS FOR IMPLEMENTING THESE METHODS

(71) Applicant: LEICA MICROSYSTEMS CMS GMBH, Wetzlar (DE)

(72) Inventors: Frank Sieckmann, Wetzlar (DE); Frank Hecht, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 22 days.

(21) Appl. No.: 18/705,602

(22) PCT Filed: Nov. 2, 2021

(86) PCT No.: PCT/EP2021/080374
§ 371 (c)(1),
(2) Date: Apr. 29, 2024

(87) PCT Pub. No.: WO2023/078527
PCT Pub. Date: May 11, 2023

(65) Prior Publication Data
US 2024/0411123 A1      Dec. 12, 2024

(51) Int. Cl.
G02B 21/36          (2006.01)
(52) U.S. Cl.
CPC ......... *G02B 21/367* (2013.01); *G02B 21/368* (2013.01)
(58) Field of Classification Search
CPC ............................ G02B 21/367; G02B 21/368
(Continued)

(56) References Cited

U.S. PATENT DOCUMENTS 11,676,366 B1 * 6/2023 Cooke .................... G06V 10/60
382/154
2013/0279752 A1   10/2013 Thomas et al.
(Continued)

FOREIGN PATENT DOCUMENTS

EP          2796917 A1    10/2014

OTHER PUBLICATIONS

Guo, Min et al.; "Rapid image deconvolution and multiview fusion for optical microscopy"; *Nature Biotechnology*, Jun. 29, 2020; pp. 1337-1346; vol. 38, No. 11; XP037294243; Nature Portfolio; London, UK.
(Continued)

*Primary Examiner* — Jayanti K Patel
*Assistant Examiner* — Richard B Carter
(74) *Attorney, Agent, or Firm* — LEYDIG, VOIT & MAYER, LTD.

(57) ABSTRACT

A method for providing position information for retrieving a target position in a microscopic sample includes providing a first representation of the sample at a first resolution including the target position; specifying a first target position identifier indicating the target position at the first resolution; acquiring an image stack comprising the target position indicated by the first target position identifier; providing a second representation at a second resolution higher than the first resolution based on the image stack; specifying a second target position identifier indicating the target position at the second resolution; specifying a plurality of reference position identifiers in the second representation indicating positions of optically detectable reference markers at the second resolution; and determining a set of geometric descriptors describing spatial relations between the second target position identifier and the plurality of reference position identifiers to provide the position information.

17 Claims, 7 Drawing Sheets

(58) Field of Classification Search
USPC ...................................... 348/79, 80; 382/154
See application file for complete search history.

(56) References Cited

U.S. PATENT DOCUMENTS

| | | | | |
|---|---|---|---|---|
| 2014/0226003 A1* | 8/2014 | Phaneuf | .................. | H01J 37/28 |
| | | | | 348/80 |
| 2015/0130921 A1* | 5/2015 | Ohashi | ................. | G02B 21/367 |
| | | | | 348/79 |
| 2019/0137743 A1 | 5/2019 | Schumann | | |
| 2019/0294317 A1 | 9/2019 | Ward et al. | | |
| 2020/0218054 A1* | 7/2020 | Sase | ........................ | H01J 37/26 |
| 2021/0182531 A1 | 6/2021 | Chang et al. | | |

OTHER PUBLICATIONS

Kizilyaprak, Caroline et al.; "Focused ion beam scanning electron microscopy in biology"; *Journal of Microscopy*; Apr. 7, 2014; pp. 109-114 (Abstract); vol. 254, No. 3; John Wiley & Sons, Inc.; Hoboken, NJ, USA.

* cited by examiner

METHOD FOR PROVIDING POSITION INFORMATION FOR RETRIEVING A TARGET POSITION IN A MICROSCOPIC SAMPLE, METHOD FOR EXAMINING AND/OR PROCESSING SUCH A TARGET POSITION AND MEANS FOR IMPLEMENTING THESE METHODS

CROSS REFERENCE TO RELATED APPLICATIONS

This application is a U.S. National Phase application under 35 U.S.C. § 371 of International Application No. PCT/EP2021/080374, filed on Nov. 2, 2021. The International Application was published in English on May 11, 2023 as WO 2023/078527 A1 under PCT Article 21(2).

FIELD

The present invention relates to a method for providing position information for retrieving a target position in a microscopic sample, a method for examining and/or processing a microscopic sample at such a target position, and means for implementing these methods in the form of an apparatus, an examination arrangement and a computer program.

BACKGROUND

As mentioned in C. Kizilyaprak et al., "Focused ion beam scanning electron microscopy in biology", J. Microsc. 254 (3), 109-114, focused ion beam scanning electron microscopy (FIB-SEM) is progressively used in biological research. A focused ion beam scanning electron microscopy instrument is a scanning electron microscope (SEM) with an attached gallium ion column in which beams of electrons and ions may be focused to coincident points. One application of focused ion beam scanning electron microscopy is the acquisition of three-dimensional tomography data wherein, with the ion beam, thin layers of the surface at a target region are repetitively removed and the remaining block-face is imaged with the electron beam in a likewise repetitive manner. A focused ion beam scanning electron microscopy instrument can also be used to cut open structures for getting access to internal structures or to prepare thin lamellas for imaging by (cryo-)transmission electron microscopy.

SUMMARY

In an embodiment, the present disclosure provides a method for providing position information for retrieving a target position in a microscopic sample. The method includes the steps of: a) providing a first digital representation of the sample or a part of the sample at a first resolution including the target position; b) specifying a first target position identifier in the first digital representation indicating the target position at the first resolution; c) acquiring an image stack in a region of the sample including the target position indicated by the first target position identifier; d) providing a second digital representation at a second resolution higher than the first resolution based on the image stack; e) specifying a second target position identifier in the second digital representation indicating the target position at the second resolution; f) specifying a plurality of reference position identifiers in the second digital representation indicating positions of optically detectable reference markers at the second resolution; and g) determining a set of geometric descriptors describing spatial relations between the second target position identifier and the plurality of reference position identifiers to provide the position information.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
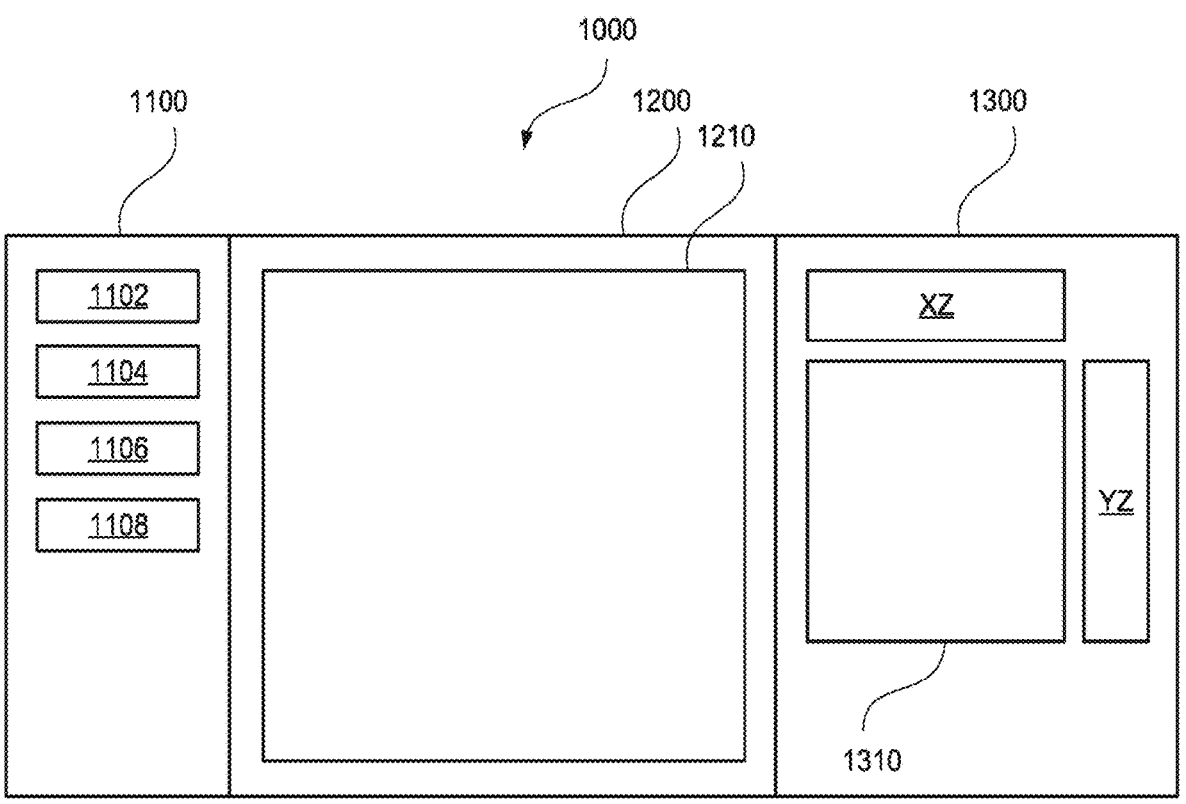
FIG. 1 illustrates a graphical user interface in a general view.

Embodiments of the present invention overcome the present disadvantages of techniques using focused ion beam scanning electron microscopy and other methods of examining and processing microscopic samples.

In an embodiment, a method for providing position information for retrieving a target position in a microscopic sample is proposed. The method comprises the steps of (a) providing a first digital representation of the sample or a part thereof at a first resolution including the target position, (b) specifying a first target position identifier in the first digital representation indicating the target position at the first resolution, (c) acquiring an image stack in a region of the sample including the target position indicated by the first target position identifier, (d) providing a second digital representation at a second resolution higher than the first resolution on the basis of the image stack, (e) specifying a second target position identifier in the second digital representation indicating the target position at the second resolution, (f) specifying a plurality of reference position identifiers in the second digital detail representation indicating positions of optically detectable reference markers at the second resolution, and (g) determining a set of geometric descriptors describing spatial relations between the second target position identifier and the plurality of reference position identifiers to provide the position retrieval information.

The term "target positions", as used herein, relates to positions of a sample which are to be worked on in an examination or processing apparatus or method such as, but not limited to, ion beam scanning electron microscopy. Using the instrumentalities as proposed herein, a subsequent retrieval of such target positions is significantly improved because position information provided accordingly allow for an easy and reliable identification of patterns including the target position.

A "digital representation" may be a digital image which may or may not be composed, combined, or synthesized from a plurality of images or image regions with identical or different focus settings or covering the same or different image regions, such as by stitching or merging different image layers. A digital representation may particularly be a focus map combining different partial images in each of which different focus settings are present.

The term "image stack" (or Z-stack) as used herein shall refer to a stack of images of the same or essentially the same region of an object, which are acquired at different focus or lens distances using an optical imaging method. An image stack may be used to form a three-dimensional representation of the region, or images of the image stack may be merged to give a resulting image with a greater depth of field (DOF) than any of the individual images of the image stack. For the avoidance of doubt, the term "image stack" shall refer to a plurality of images obtained accordingly and not a merged image or a derived three-dimensional representation generated based on the individual images. All features of the images of an image stack may be in focus, such as in a confocal instrument, or these may, such as in a wide-field instrument, comprise in-focus and out-of-focus features. In more general terms, an "image stack" is a plurality of images without intended lateral (X, Y) displacement but acquired at different Z positions.

Acquiring an image stack has, in connection with instrumentalities proposed herein and in particular embodiments, the particular advantage that positions may be identified with sub-pixel resolution, i.e. particularly with a resolution exceeding that of the first digital representation, by providing a higher-resolution second representation, e.g. by interpolation. That is, a higher-resolution definition, particularly for a later retrieval of regions of interest in a higher-resolving examination apparatus, becomes possible.

Particularly if techniques comprising different resolutions are used for providing and retrieving position information, as found by the present inventors, data and position information obtained in the lower resolution (such as a light microscopic) technique can conventionally only be used to a limited extent in the higher resolution (such as an electron microscopic) technique because the position information is provided at a too low resolution. The instrumentalities proposed herein overcome this problem.

Generally, as "reference markers", fluorescence beads or so-called quantum dots as known in the field of fluorescence microscopy, e.g. with a size of up to 1 μm or more specifically with a size of 10 to 500 or 50 to 200 nm may be used. Such beads may be provided as beads with different fluorescence responses in the optical spectrum. Quantum dots also have the advantage that they do not fade when exposed to light for a long time. Quantum dots are therefore customizable light points that shine with undiminished brightness. There is no limitation as to the specific types of beads and any other types of reference markers may be used, which, in a preferred embodiment, are also identifiable in a different type of microscopy in which the target positions are to be retrieved. In a preferred embodiment, the reference markers may be distributed randomly in the sample. The term "optically detectable" shall refer to any type of detection of an optic response, e.g. in the visible or non-visible range of the light spectrum.

The term "position identifier" shall generally refer to any form of data defining a position, such as, but not limited to, pixel coordinates in an overview scan, coordinates defined in relation to a base point, such as defined on a microscope stage, a sample carrier, the sample, an image obtained from the sample, etc. The term "coordinates" is to be understood broadly herein and shall refer to Cartesian, polar, and any other form of coordinates conceivable, such as, in a particular embodiment, pixel counts in an image.

In more particular embodiments of the present invention, position markers may also be derived based on an estimate of a position by suitable interpolation from positions measured or otherwise detected. Thus, subpixel interpolation methods can estimate an intermediate position value between two pixels.

The subpixel interpolation (especially in the three dimensions X, Y and Z) can be represented visually. Thus, a visual representation and a position measurement can be made in the subpixel area of an image when this relatively blurred image is presented to a human. The human brain is able to recognize a structure and certain objects even in blurred images. According to embodiments of the present invention, this makes a kind of localization microscopy possible because the combination of a visual presentation of an interpolated subpixel image and a position marker within this image by a human enables the human to mark a position in the subpixel area corresponding to X, Y and Z coordinates, and thus to achieve a significantly increased spatial resolution.

In other words, the user interface as described before is configured to expand the visible area of at least one of the views when zooming into a subarea by subpixel interpolation. These generated subpixels provide increasingly better position estimation purely by computation. Furthermore positions such as the before mentioned reference identifiers or position markers can be positioned on these subpixels, thereby enabling an increased spatial resolution estimate.

By defining target positions in relation to reference markers, the generation of individual, recognizable and unique patterns is possible which allows, as mentioned, for a reliable, quick, and resource-friendly retrieval of such target positions.

The target position mentioned may be a first target position and the method may be adapted for providing position information for retrieving one or more further target positions by performing steps (b) to (g) indicated above for the or each of the further target positions. The regions of the sample in which the image focus stacks are acquired for the first and the or each of the further target positions may be disjoint regions, such that advantageously each target position has its "individual environment" not overlapping with that of other target points. Recognition of individual patterns may thereby be significantly enhanced.

In step (f) mentioned above, reference position identifiers in a distance larger than a lower distance threshold to the target position and/or in a distance smaller than an upper distance threshold to the target position may be specified in the second digital detail representation. Selecting minimum and maximum distances of reference position identifiers accordingly contributes to reliability and ease of pattern recognition.

A light microscopic device may be used for acquiring the image focus stack and the second resolution may be a digital resolution exceeding the optical resolution of the light microscopic device. Using the method steps described before, positions may, in particular embodiments, be defined with sub-pixel accuracy, i.e. at a precision exceeding the precision conventionally usable in connection with light-microscopic images.

Providing the second digital representation may, in particular embodiments, include interpolating image pixels within and/or between individual images of the image focus stack to yield the second resolution. Interpolating methods may be selected for providing a calculated continuity between original pixels defining a feature in an image, such that selecting positions in between pixels and/or images is particularly simplified.

Providing the first digital representation may include computationally merging a plurality of light microscopic images, and the plurality of light microscopic images may, in a particular embodiment, be acquired at least in part at different lateral positions and/or different focus positions. This approach may correspond to provide a "focus map", e.g. an artificially generated image in which different image regions that are classically in focus and out of focus are all provided with maximum information content to a user, enabling a targeted selection.

Providing the first digital representation may include displaying at least a part of the first digital representation in a first display region of a graphical user interface rendered by a computing device on a display, and specifying the first position identifier may, in a particular embodiment, include receiving and processing a first user input of a user of the computing device, said first user input indicating a position in the first display region of the graphical user interface. This allows, particularly with further features provided, an easy (pre-) selection and identification of target features for further processing.

In a particular embodiment, providing the second digital representation may comprise obtaining a three-dimensional representation on the basis of the image focus stack and displaying one or a plurality of two-dimensional views of the three-dimensional representation in a second display region of the graphical user interface. The two-dimensional view, or the plurality of two-dimensional views, allows for an easy examination of the three-dimensional space surrounding the position of interest, such as in a top-view and in two lateral views.

Specifying the second position identifier may include receiving and processing a second user input of the user of the computing device, said second user input indicating a position in the second display region of the graphical user interface. This allows for a high-resolution specification with a higher precision for the position of interest previously selected and identified in the lower-resolution overview or first representation.

In addition, a step of specifying coarse reference position identifiers at the first resolution in the digital first representation indicating coarse positions of the visible reference markers in the microscopic sample may be included. This allows a user to (pre-)select a particular set of reference markers which e.g. are particularly easily recognizable as a pattern.

The geometric descriptor set may be determined as a vector set or directed graph and/or the position information may be provided in the form of coordinates relative to a reference point determined on the basis of or relating to the vector set or directed graph. Handling of data provided in such a way may, in a particular embodiment, be adapted to capabilities of a computer used in performing the method and data provided accordingly allow for a particularly precise definition of positions in way easily understood by a skilled user.

Providing the position retrieval information may, in particular embodiments, include modifying the geometric descriptors based on an estimate of a shrinkage of the sample in a subsequent process. This has the particular advantage that a reliable retrieval of target and reference points is possible also in cases in which e.g. water evaporating or sublimating from ice in a vacuum, causing the sample to shrink and the positions of the target and reference points to shift in a certain way, is possible.

Position information obtained as explained above may, in a particular embodiment, be supplied to a further processing device for further processing of the sample, such that, particularly when using examination instruments with different resolutions, a retrieval of positions defined with a higher precision that previously known becomes possible.

Embodiments of the present invention also provide a method for examining and/or processing a target position and means for implementing the proposed methods in the form of an apparatus adapted to perform a corresponding method, a microscopic examination arrangement, and a computer program.

Embodiments of the present invention also provide a user interface for a microscopic examination arrangement, the user interface comprising a first viewing area configured to display a first view of a three-dimensional image stack in a first layer and a second viewing area for displaying a second view of the three-dimensional image stack in a second layer. The first and the second layer may be orthogonal to each other and the second viewing area may be arranged neighbouring the first viewing area on the user interface. The user interface may be configured to adapt a display size of the second viewing area on the user interface based on a chosen zoom factor in the first viewing area. An advantage of adapting the display size correspondingly, particularly of enlarging the second viewing area when enlarging the zoom factor, is that a comparatively larger area around a feature of interest may be examined in the second viewing area, and thus even at larger zoom factors, where generally less recognizable features are present in a view of a certain size, a more reliable definition of such features of interest, such as a target or reference position, becomes possible. While enlarging the second viewing area, the first viewing area may be correspondingly reduced in size in order to fit on a display region of the user interface.

The user interface may be configured to adapt a visible area of the second view in the second viewing area based on a visible area of the first view in the first viewing area. This may include that, for example, in the first view a range of 100 to 110 μm is displayed and the same range is also displayed in the second viewing area. A user may therefore navigate more easily in corresponding views.

The user interface may further comprise a third viewing area configured to display a view of the three-dimensional image stack in a third layer. The second viewing area may be arranged above or below the first viewing area on the user interface, the third viewing area may be arranged to the right or the left of the first viewing area on the user interface, and the first, the second layer and the third layer may be orthogonal to each other. The user interface may be configured to adapt a display size of the third viewing area on the user interface based on at least one of a chosen zoom factor in the first viewing area and a chosen zoom factor in the second viewing area, in an embodiment essentially as explained for the second viewing area. This allows for a user to intuitively inspect a corresponding image stack from three directions and therefore to more reliably define a feature of interest, such as a target or reference position.

The user interface may be configured to adapt the visible area of the third view in the third viewing area based on at least one of the visible area of the first view in the first viewing area and the visible area of the second view in the second viewing area, such that also in such a third view an easy navigation is possible.

The user interface and embodiments thereof may be provided together with, or independently from, the methods, arrangements and apparatus provided according to embodiments of the present invention.

Structures to be worked on using focused ion beam scanning electron microscopy techniques (referred to as "target positions" herein) may be identified in a light or fluorescence microscope wherein a sample carrier with a sample is imaged, and coordinates or other geometric descriptors of the target positions are defined. The sample carrier with the sample may then be transferred to the focused ion beam scanning electron microscopy instrument together with the target position coordinates or descriptors, and the target positions are processed in the focused ion beam scanning electron microscopy instrument accordingly in order to find the section of interest. The microscopic sample may be a cell, a group or association of cells, a tissue or any other type of biological or non-biological matter affixed to the carrier which may be examined in a light or fluorescence microscope to define target positions. In the focused ion beam scanning electron microscopy technique, using the ion beam, ultrathin sections ("lamellas") may be formed from such a sample thereafter, which are thin enough to be imaged in transmission electron microscopy. Embodiments of the present invention may be used to ensure that a target position identified in the light or fluorescence microscope, and referred to by corresponding to X, Y and Z coordinates, is ultimately contained in the ultrathin section prepared by the ion beam scanning electron microscopy technique.

Embodiments of the present invention are not limited to one of the focused ion beam scanning electron microscopy techniques as outlined before but can likewise be used with other microscopic methods, and in particular embodiments including a light or fluorescence microscope and an electron microscope, or more generally a microscope providing a lower resolution and a microscope providing a higher resolution, wherein target positions are first defined in the light or fluorescence microscope (or the microscope providing the lower resolution) and such target positions are then to be retrieved and processed in the electron microscope (or the microscope providing the higher resolution). Only for reasons of conciseness, and without any intended limitation, the microscope providing the lower resolution or a corresponding technique is referred to as a "light or fluorescence microscope" or "light or fluorescence microscopy" and the microscope providing the higher resolution or a corresponding technique is referred to as an "electron microscope" or "electron microscopy" herein. An examination apparatus usable according to embodiments of the present invention may also be a laser microdissection device or method. In the latter, examination and processing may also be performed in the same instrument.

In the Figures which will now be explained in connection with further features of embodiments of the present invention, elements, method steps, apparatus features, etc., of similar or identical construction and/or function are indicated with like reference numerals. A repeated explanation is omitted for reasons of conciseness. Explanations relating to process units or components likewise relate to corresponding method steps and vice versa.

Figure 6:
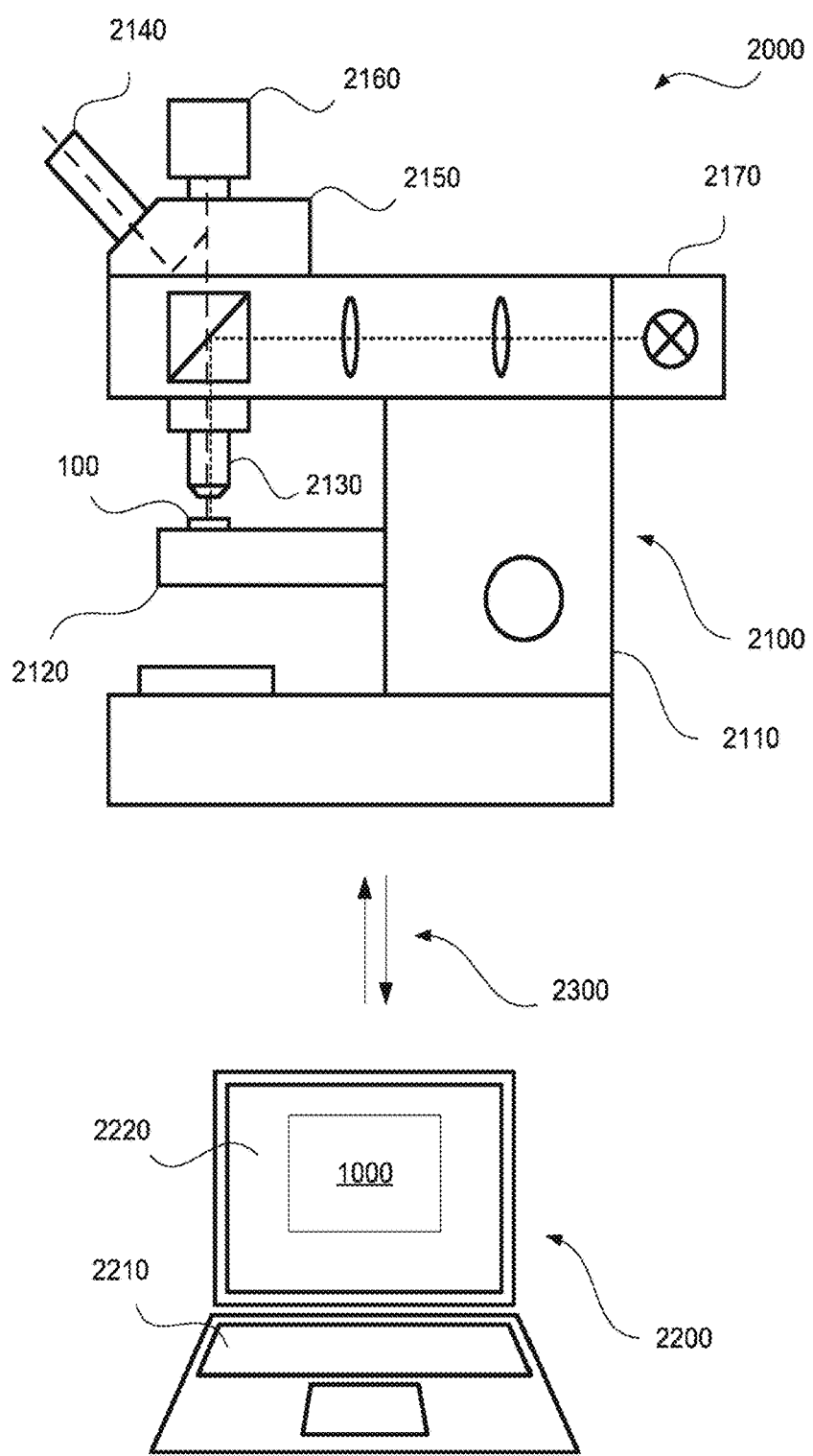
FIG. 6 illustrates a computerized microscope system.

FIG. 1 illustrates a graphical user interface, which may be used in a method according to an embodiment of the present invention in a generalized view. The graphical user interface is designated 1000 and may particularly be rendered on a screen of a computer system, such as the computer system 2200 as illustrated in FIG. 6. Embodiments of the present invention may be realized with or without a graphical user interface 1000 and that the following explanations are given only for the reason of understanding embodiments of the present invention.

Graphical user interface 1000 may comprise, additionally to the components described here, more or less components and the components may be provided in the arrangement shown or in a different arrangement. The arrangement may also be dynamic and/or user-adaptable, depending on specific display and selection needs. The graphical user interface 1000 may be implemented using any type of user interface toolkits and on any type of operating system of a computer system.

In the example illustrated, graphical user interface 1000 contains, in a left panel 1100, a number of operating elements 1102 to 1108, such as, but not limited to, (radio) buttons, text fields, sliders, and selection lists as generally known in the field of graphical user interfaces. These may be arranged in a panel, as shown, but also at other positions of the graphical user interface 1000 and in a different arrangement. The operating elements 1102 to 1108 may be used, among others, and not restricted thereto, to enter experiment names, trigger functions of a microscope system such as the microscope system 2100 as illustrated in FIG. 6, to open file selectors, to trigger an experiment, to save files, and to trigger a transfer of data from one system to another.

A central panel 1200 of the graphical user interface 1000, herein also referred to a "first display region" is provided for displaying an overview 1210 of a sample 100. A right panel 1300 of the graphical user interface 1000, herein also referred to a "second display region" for displaying three two-dimensional views 1310, XZ, YZ, of a three-dimensional representation of the sample, particularly in an increased resolution. View 1310 may particularly be a view from the same direction as the view in the overview 1210 and views XZ and YZ may be sections, slices or views in planes orthogonal thereto. Features of the user interface 1000 illustrated in FIG. 1 may particularly include those illustrated in connection with FIGS. 7A and 7B below. As mentioned, embodiments of the present invention are in no way limited to a specific arrangement or number of views and the views may particularly be provided in a user-modifiable manner, such as to select the field of view, etc., particularly by using a mouse, touchpad or other user input means.

According to embodiments of the present invention, a workflow is proposed which may particularly include to create an overview 1210 of the sample to find cells or objects of interest, the overview 1210 particularly including a first digital representation 200 mentioned before and being displayed in the first display region 1200 of graphical user interface 1000. The overview 1210 can optionally be provided with or in the form of a focus map, i.e. different regions of the overview 1210 may be provided in different focus positions so that preferably all images of the overview scan are in focus.

FIGS. 2A to 2D illustrate the graphical user interface 1000 of FIG. 1 according to different method steps provided in an embodiment of the present invention. Again, features of the user interface 1000 illustrated in FIGS. 2A to 2D may particularly include those illustrated in connection with FIGS. 7A and 7B below. Reference numerals for the method steps used here correspond to the simplified view of FIG. 5, wherein a method 500 according to an embodiment of the present invention is displayed in the form of a simplified process flow diagram.

Figure 2A:
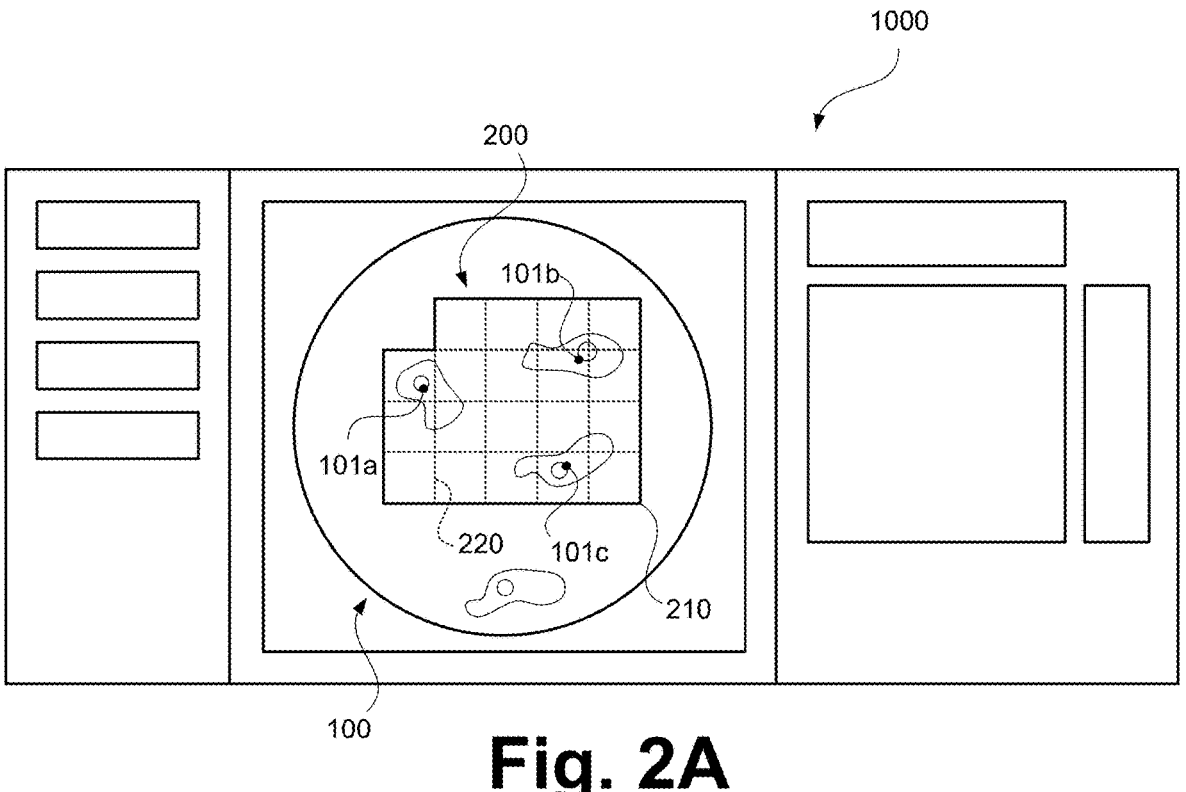
FIGS. 2A to 2D illustrate the user interface of FIG. 1 in different method steps.

A first method step 510, in which the graphical user interface 1000 is used as illustrated in FIG. 2A, a first digital representation 200, i.e. particularly a digital pixel image, of a microscopic sample 100 or a part thereof is displayed in overview 1210 (see above) at a first resolution, such as a resolution of the optical instrument used in generating the first digital representation, and the first digital representation includes one or a plurality of target positions 101a to 101c such as regions of interest to be operated on in an electron microscope with focused ion beam or any other type of higher-resolution instrument.

The first digital representation 200 may also be provided as a merged image 210 by adding partial images 220 with e.g. different focus settings to obtain a focus map, as mentioned. Depending on a selection of a user, which e.g. may include clicking, encircling, or drawing boxes around targets of interest or their target positions 101a to 101c, for the or at least one of the target positions further steps are performed.

In particular embodiments of the present invention, the first resolution in the first digital representation 200 (such as the overview mentioned) is, as also further explained below, not higher than an optical resolution of an instrument used in providing the first digital representation (the overview scan) and may be lower. Although a target position 101a to 101c is referred to in the singular herein, and one specific target position 101a is further referred to below, the methods proposed herein and embodiments thereof may generally be used in connection with a plurality of target positions 101a to 101c.

A coarse or rough marking of a region of interest or target position 101a to 101c may be performed, typically by a user, in the overview 1210, i.e. in the first digital representation 200. Each of such regions or positions 101a to 101c marked is later on worked on according to the present invention as further explained below.

Figure 2B:
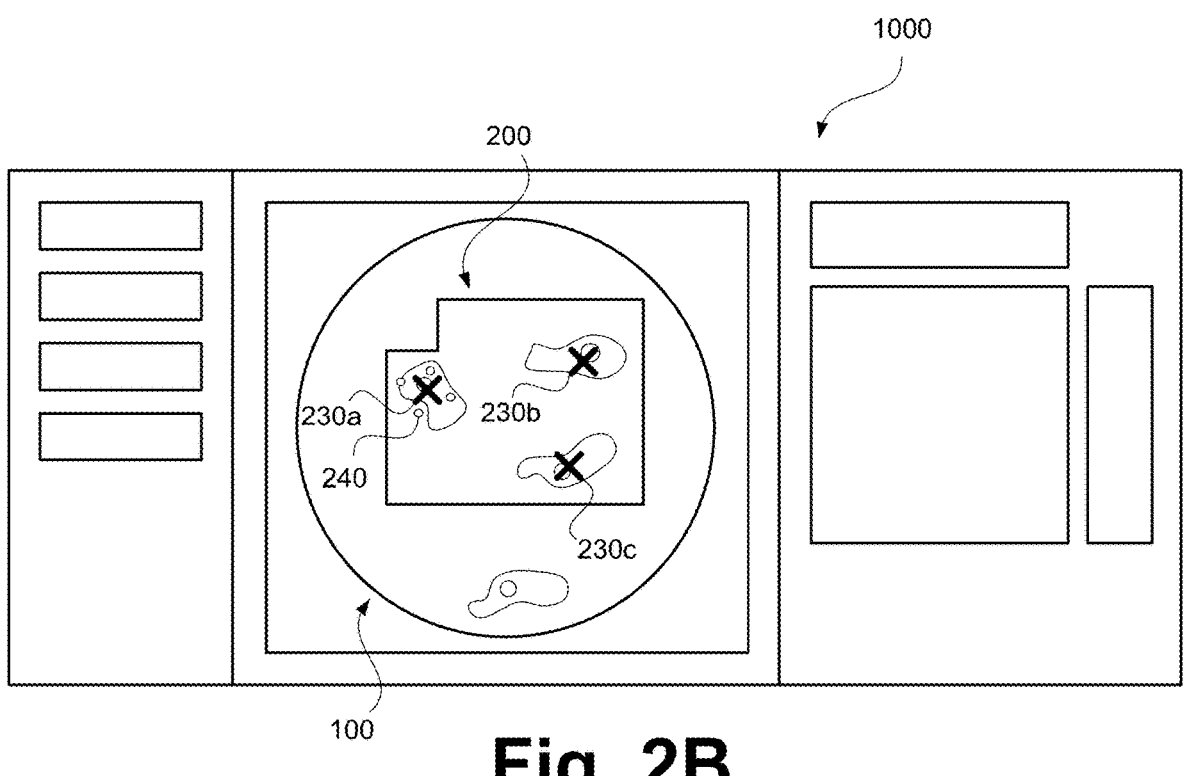

That is, in a step 520, corresponding to FIG. 2B, for the or each of the target positions 101a to 101c, a first target position identifier 230a to 230c in the first digital representation 200 indicating the target position 101a to 101c at the first resolution is specified. The first target position identifier 230a to 230c may be displayed or not and may be kept in memory only for later use. The first target position identifier 230a to 230c is shown in FIG. 2B in an exaggerated manner. A coarse reference position identifier, which can also be identified, is referred to with 240.

Specifying the first target position identifier 230a to 230c in the first digital representation 200 indicating the target position at the first resolution may, according to embodiments of the present invention, particularly be made by a user clicking to a certain position in the first digital representation 200 or overview 1210 just mentioned.

According to an embodiment of the present invention, the method now proceeds with a further step of obtaining an image stack or Z-stack which initially includes images at the corresponding target region identified and at the first resolution. In other words, an image stack is acquired in a region of the sample including the target position indicated by the first target position identifier 101a to 101c but advantageously not including a further target position.

Figure 2C:
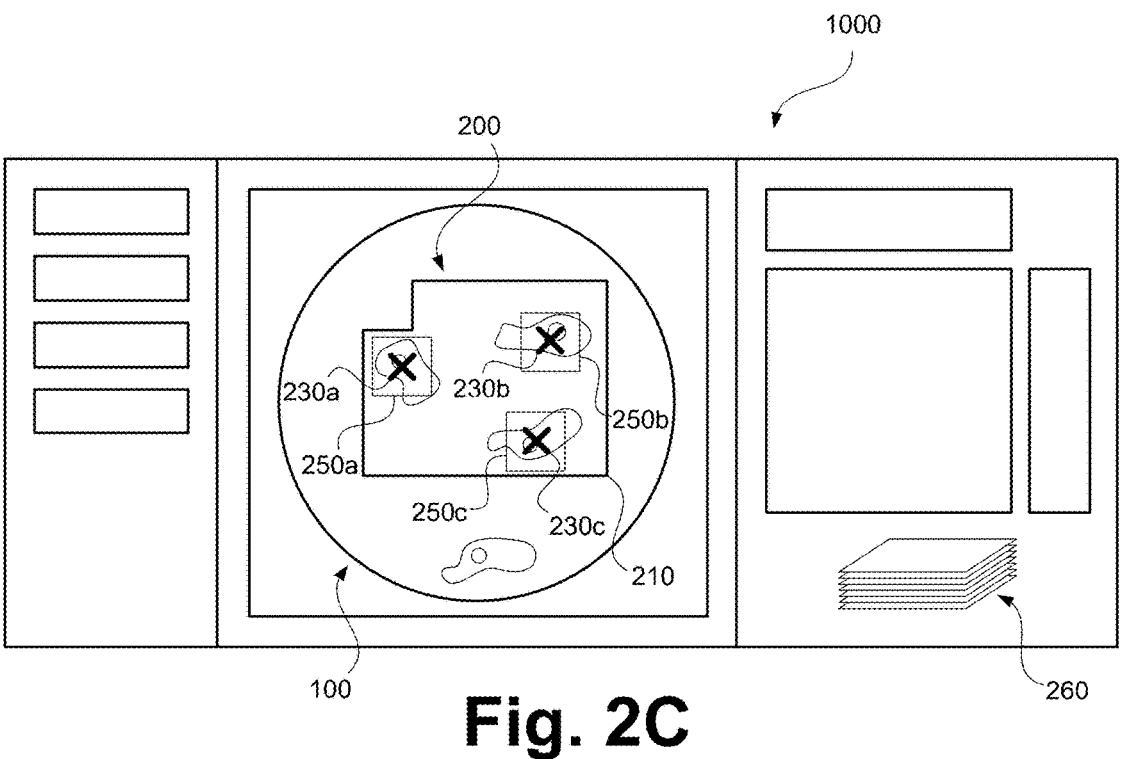
Figure 5:
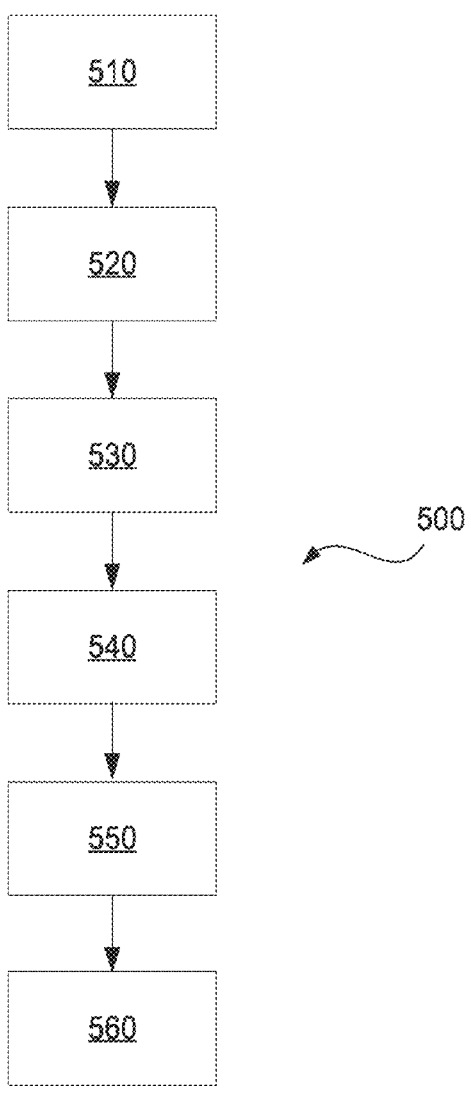
FIG. 5 illustrates a method in the form of a flow diagram.

This method step is indicated with 530 in FIG. 5 and corresponds to FIG. 2C where an image stack indicated with 260 is acquired, essentially as explained above, and in a region of the sample 100 including the target position 101a to 101c indicated by the first target position identifier 230a to 230c. As mentioned, when several target positions were identified, several image stacks 260 are typically acquired and these do advantageously not overlap for the reasons explained above. The regions in which image stacks 260 are obtained for three target positions 101a to 101c and their first target position identifiers 230a to 230c are indicated with 250a to 250c. An example of an image stack 260 is illustrated in the right part of the graphical user interface 1000.

Provision of (artificial) data with a higher resolution than the first resolution, i.e. particularly higher than the resolution of an optical instrument used in obtaining the first digital representation or overview scan may particularly be realized, in embodiments of the present invention, by performing a deconvolution between pixels of the individual images of the image stack 260, but also between pixels of different images of the same image stack 260.

Figure 2D:
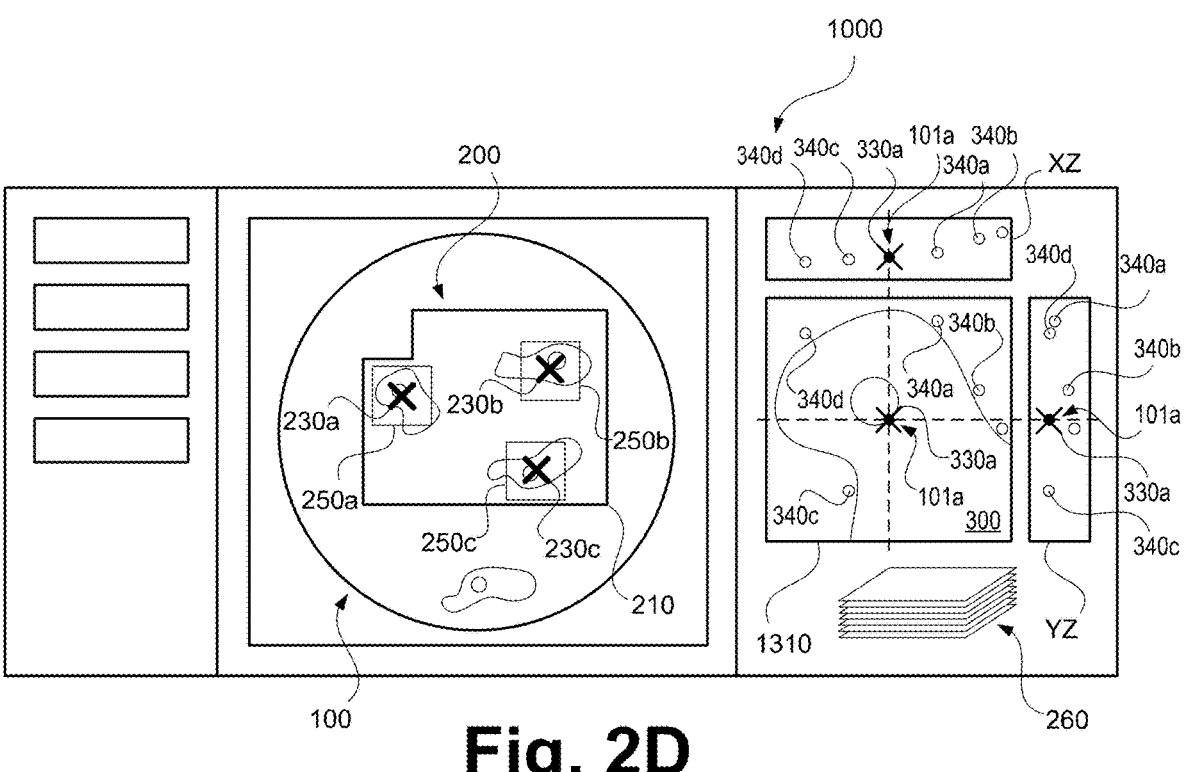

In a corresponding step 540, also corresponding to FIG. 2D, a second digital representation 300 at a second resolution higher than the first resolution is provided on the basis of the image stack 260 and displayed according to the views 1310, XZ and YZ in the right part of the graphical user interface 1000. This step particularly includes interpolating image pixels within and/or between individual images of the image stack 260 to yield the second resolution, particularly in the form of a blurred image and to be able to provide indications at a sub-pixel resolution as explained in detail above. If several target positions are identified and target position identifiers 101a to 101c are defined accordingly, the corresponding image stacks 260 may be displayed selectively and one after another.

The approach used in this connection may also be considered to resemble a kind of "optical zooming" which (apparently) increases the resolution of the image obtained. A resolution-increased image of the present invention does typically not provide additional information in the form of resolved features of the sample (i.e. it is, in classical optical or microscopic terms, an "empty magnification"). However, despite this, it allows a user, in the resolution-increased image data, i.e. particularly in a corresponding digital representation, to select a region of interest at a higher resolution than before in that he or she may point, particularly in borderline cases, to positions "between" certain pixels, which would not have been possible without such a resolution increase.

The resolution increase particularly includes a deconvolution method and a suitable definition for an image stack experiment used according to embodiments of the present invention, which may particularly be loaded once a user has performed a region of interest selection, and which may contain instructions for deconvolution.

In embodiments of the present invention, when the graphical user interface 1000 is used as mentioned before, a detail viewer or detail viewing region may show deconvolution or resolution-increased data (i.e. the second digital representation at a second resolution higher than the first resolution based on the image stack) in a user-accessible way, particularly in form of slices or other two-dimensional representations, such as cross-sections, of three-dimensional data, and an overview region already mentioned above may show the raw data.

The plurality of reference position identifiers may e.g. be specified in the second digital detail representation by a user clicking at corresponding positions in an image, the reference position identifiers thus indicating positions of optically detectable reference markers.

As mentioned, a user may, in the higher-resolution image or any representation derived therefrom, again identify the target position(s) but, in this case, due to the fact that said definition is performed in the higher-resolution image or representation, at a higher resolution as before, i.e. as in the overview scan or first digital representation. In this way, a user is specifying a second target position identifier in the second digital representation indicating the target position at the second resolution.

This corresponds to step 550, the result of which is also shown in FIG. 2D wherein one second target position identifier in the second digital representation 300 is indicated 330*a*. This second target position identifier 330*a* is indicating the target position 101*a* at the second resolution and is identified particularly by a user. Furthermore, in a step 560 whose result is likewise shown in FIG. 2D, a plurality of reference position identifiers 340*a* to 340*d* in the second digital detail representation 300 indicating positions of visible reference markers in a specified distance range to the target position 101*a* at the second resolution is identified. Again, the indicators are shown in an exaggerated manner and not necessarily have to be displayed in the form shown here or at all.

Orthogonal views XZ and YZ simplify the identification of elements of the representation 300. As already mentioned above in connection with FIG. 1, view 1310 may particularly be a view from the same direction as the view in the overview 1210 and views XZ and YZ may be sections or views in planes orthogonal thereto. That is, the view 1310 may be a view from a direction orthogonal to the image planes of the images forming the image stack 260 (i.e. from a Z direction) and views XZ and YZ may be views orthogonal to each other and also orthogonal to the Z direction. In other words, views XZ and YZ are side views of the image stack 260 and view 1310 is a top view thereof. Instead of top views and side views, also image slices of the three-dimensional image stack 260 or a dataset derived therefrom may be obtained in essentially parallel planes and displayed for user examination. As illustrated with corresponding reference numerals, in the views XZ and YZ, being side views of the image stack 260 in the example shown, the same features, particularly including the target position 101*a* and the reference position identifiers 340*a* to 340*c* may also be recognized and correspondingly the target position identifier 330*a* may be identified.

In an embodiment, this allows for an observation of a target position 101*a*, and of reference markers from three orthogonal directions, i.e. from the Z direction according to view 1310 and from the views XZ and YZ orthogonal thereto, and in a high resolution. In a further embodiment, features illustrated in FIG. 2D for the views 1310, XZ and YZ may particularly be combined with features illustrated in FIGS. 7A and 7B below.

In the higher-resolution image or any representation derived therefrom, i.e. in the second representation 300, in such a step, a fine positioning is therefore realized, particularly in a corresponding region of the graphical user interface 1000. The aim here is to achieve the highest possible "spatial resolution". At the same time, orientation points are to be defined which are the positions of (at least some of the) reference markers already explained above. Particularly, these are oriented in a random, and thus a recognisable, distribution pattern such that a user can later retrieve at least some of the positions of the reference markers.

As, in an embodiment of the present invention, the image stack 260 or a representation thereof is presented in the three orthogonal views 1310, XZ and YZ, each point, and thus also the reference markers, are observable from each of these views and therefore a confirmation of their position from all directions is possible, thus avoiding false positive identifications and increasing the precision with which they may be located.

In performing the method steps above or on the basis thereof, furthermore, a set of geometric descriptors, which are explained in connection with a set of descriptors 400 below is generated, these descriptors describing spatial relations between the second target position identifier 330*a* and the plurality of reference position identifiers 340*a* to 340*d* is defined to provide the position retrieval information for the target position. These geometric descriptors are explained in further detail below and may e.g. be provided in the form of graphs, vector sets, etc. They may be normalized, e.g. distances between the target position identifier and the reference position identifiers may be calibrated to the largest or smallest length. Generating said descriptors may be performed in a step 570 which is not, or is at least not necessarily, realized using graphical user interface 1000.

According to an embodiment of the present invention, the method is particularly adapted to provide a plurality of target positions in the same manner as described for one target position before. Expressed in other terms, the target position referred to before may be a first target position and the method may be adapted for providing position information for retrieving one or more further target positions by performing the steps allowing for the or each of the further target positions. In this connection, the regions of the sample in which the image focus stacks are acquired for the first and the, or each of the, further target positions are particularly disjoint regions, as explained for regions 250*a* to 250*c* in connection with FIG. 2D. That is, the images of different image stacks 260, i.e. of image stacks 260 obtained for different target regions, particularly do not overlap, i.e. they particularly are acquired for disjoint regions of the sample or of the overview scan obtained. As, according to embodiments of the present invention, the images of different focus stacks particularly do not overlap, each individual region of interest preferably corresponds to one focus stack. A particularly advantage of this is that each target position or position of interest is surrounded (only) by "its own" markers and as such individual patterns may be generated, simplifying pattern recognition by a user.

Aspects of embodiments of the present invention are now, in part repeating what was already said above, further explained in other words.

Instrumentalities proposed according to embodiments of the present invention include a definition and implementation of a suitable user interface, particularly to exploit human abilities of pattern recognition and to request a user to mark a position in interpolated images suitable to the visual senses of the user. To this purpose, two and preferably parallel representations of a view of an object are generated, one of which provides a rough orientation or overview through an eagle's eye view and the other of which, as also explained below, particularly shows in parallel a detailed view of a small environment around a point in the overview, particularly as an unfolded image with minimal artefacts and in the form of a partial three-dimensional representation for different plane. In this second view, actual positions of regions of interest and of reference markers are indicated by the user. As mentioned, preferably, an image stack for each individual region of interest is provided and therefore, each region of interest, which preferably may be in a central region of the image stack, may be surrounded by "its own" ensemble of reference markers. The position of interest and the reference markers each may be defined by an individual set of coordinates in the image stack or a derived representation. In this second view, the pixels of the images are particularly interpolated (e.g. by bicubic interpolation), particularly in such a way that intermediate pixels are created. The size of these intermediate pixels becomes smaller and smaller the further the image is zoomed, but each pixel has a finite, calculated size and a distance from the centre of the image or any other reference position. These positions are only estimates, calculated by interpolation, but estimates good enough for a more accurate position estimate being made based on them.

Human pattern perception is supported according to embodiments of the present invention by creating a suitable pattern, which can be visually superimposed on an image, obtained in a further microscopic method such as electron microscopy and which gives the human user a clue as to which pattern to look for. Embodiments of the invention, by virtue of their technical aspects, therefore allow for a purposeful conditioning of human senses with a search pattern that makes it easier for a person to recognise and find a certain pattern in a complex environment. In this connection, embodiments of the invention may provide logical support of the human user in case the user is of the opinion he or she has found a part of a visual pattern. That is, based on descriptors such as certain graphs, further parts of a visual search pattern may be suggested.

Thirdly and as essentially already explained above, embodiments of the invention provide a workflow-based generation of the appropriate search patterns and representation, particularly as certain types of graphs. This step is performed particularly to ensure a "mother/daughter" relationship between target positions and reference position a way that a recognisable, mathematically describable pattern type is created thereby. Mathematical or geometrical descriptors such as graphs preferably represent a one-to-one search pattern, which can be used by the operator and also by the machine for orientation.

In a further embodiment of the present invention, an estimation of a Z-position "under" an ice cover, which is opaque for electron beams in an electron microscope on the basis of a linear affine transformation and with the support of the geometrical descriptors, particularly graphs which were determined as indicated before, is made.

With the method in certain embodiments of the present invention, a number of advantages, which will now be summarized, is provided.

As mentioned at the outset, particularly due to the different resolutions of both techniques, data and position information obtained in the lower resolution (light microscopic) technique can only be used to a limited extent in the higher resolution (electron microscopic) technique in classical methods. This problem is overcome by providing the digital representations at the second (higher) resolution and defining positions on this basis. Also inaccuracies during the acquisition of images in the lower-resolution techniques (such as colour errors, vibrations of the system, stitching artefacts, shift in image overlays of camera and confocal system, etc.) may be compensated. This also relates to limitations due to apparatus function, such as blurring generated by the point spread function and its different influence in the XY and Z directions (a sphere is imaged as an ellipsoid in Z, for example).

According to embodiments of the present invention, furthermore, a significantly better orientation is provided to a user, avoiding an unfavourable situation wherein, to define a position of interest, "a football field is scanned in the grass blade perspective". A single viewer would resemble the blade of grass perspective on the sample and scanning the whole sample "football field" would be a tedious and lengthy endeavour.

Embodiments of the present invention particularly provide a solution including an "increase of resolution" in a form usable to define a position in a precision exceeding the resolution of the imaging system used. This is an advantage as compared to techniques such as classical localisation microscopy where one needs time series of single light points whose size is in the range of the optical resolution of the light microscope. In such conventional systems, an "increase in resolution" may be calculated by determining the centre of gravity, and such systems require boundary conditions such as switchable light points and a high spatial stability of the positions over the time of the measurement. The amount of light applied during the recording time is considerable and could damage living cells.

Particularly by improving pattern recognition, a problem particularly found in electron microscopy at high resolution is addressed, where objects of interest or reference positions are often surrounded by many artefacts (dust, bicubic ice, artefacts, etc.) and covered by irregularly shaped ice shells.

Embodiments of the present invention particularly provide a user interface allowing for using the human abilities of pattern recognition and for asking a user to define or mark position in interpolated images at an artificially increased resolution that is suitable to the senses of the user. Therefore, an advantageous visual representation is provided.

According to an embodiment of the present invention, such reference position identifiers for each target position may be specified in the second digital detail representation which are in a distance larger than a lower distance threshold to the target position and/or in a distance smaller than an upper distance threshold to the target position. The lower and upper thresholds may particularly selected for providing a pattern recognizable by a human.

As also mentioned, a light (or fluorescence) microscopic device may particularly be used for acquiring the image stack. The second resolution mentioned above is particularly a digital resolution exceeding the optical resolution of the light microscopic device while the first resolution may or may not exceed the optical resolution. Using an increased resolution, as mentioned above, a sub-resolution accuracy can be obtained.

Providing the second digital representation may include, according to an embodiment of the present invention, as also mentioned before, interpolating image pixels within and/or between individual images of the image stack to yield the second resolution. As to further details and advantages, reference is made to the explanations above.

In order to provide the overview scan, i.e. the first digital representation, in an advantageous configuration where all or at least a large number or elements are in focus, providing the first digital representation may particularly include computationally merging a plurality of light microscopic images, the plurality of light microscopic images being acquired at least in part at different lateral positions and/or different focus positions. The first digital representation may thus be an overview in the form of a "focus map" as mentioned.

An important aspect of the present invention, in an embodiment, is providing a graphical user interface. As mentioned, providing the first digital representation may particularly include displaying at least a part of the first digital representation in a first display region of such a graphical user interface rendered by a computing device on a display, and specifying the first position identifier may include receiving and processing a first user input of a user of the computing device, said first user input indicating a position in the first display region of the graphical user interface.

On the other hand, providing the second digital representation may comprise obtaining a three-dimensional representation based on the image stack and displaying one or a plurality of two-dimensional views of the three-dimensional representation in a second display region of the graphical user interface, particularly in a higher resolution or magnification. Specifying the second position identifier may include receiving and processing a second user input of the user of the computing device, said second user input indicating a position in the second display region of the graphical user interface.

The two-dimensional views of the three-dimensional representation may particularly be provided in the form of three sub-regions, wherein a first sub-region, being the largest of the three sub-regions, may display a two-dimensional view whose coordinates correspond to that of the first display region, and wherein the other two of the sub-regions may be arranged at two sides of the first sub-region.

Using a corresponding graphical user interface, the user is presented both an overview and a detail view of the sample or a part thereof, the latter being based on an image stack. This avoids the situation of identifying a detail in a very large overview. Regarding advantages, reference to the explanations above regarding the "grass blade perspective" is made.

The method according to the present invention may, in an embodiment, also include a step of specifying coarse reference position identifiers at the first resolution in the digital overview representation indicating coarse positions of the visible reference markers in the microscopic sample. For this advantageous aspect, essentially the same explanations as given in connection with the coarse definition of the region(s) of interest above apply.

Figure 3:
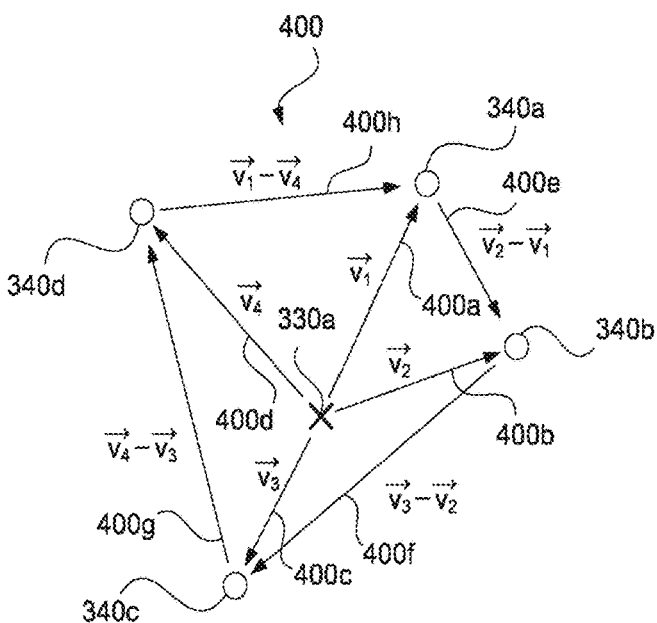
FIG. 3 illustrates a geometrical descriptor.

FIG. 3 illustrates a set 400 of geometrical descriptors usable in a method according to an advantageous embodiment of the present invention, wherein the same reference numerals 330*a* and 340*a* to 340*d* as already used in FIGS. 2A to 2D are used for target and reference position identifiers. Herein, the position identifier and the reference position identifiers are defined as nodes in a coherent graph where all nodes 330 have a node degree of 1, nodes 340*a* to 340*d* have, in the example shown, a node degree of 4, and each edge corresponds to a vector as illustrated in FIG. 3.

The properties of the graph shown in FIG. 3, i.e. the set of geometrical descriptors 400 include a preferentially star-shaped arrangement with the target position identifier 330*a* in the centre and only one the target position identifier 330*a* being present.

In the set of geometrical descriptors 400, at least one reference position identifier 340*a* to 340*d* but more favourable are at least two reference position identifiers 340*a* to 340*d* and, in the example shown, four reference position identifiers are present. The set of geometrical descriptors 400 defines a recognizable pattern with a plurality of reference position identifiers 340*a* to 340*d* and only one target position identifier 330*a*. The invention is, at least in an embodiment, particularly based on recognizability of such a pattern, particularly by a human user. The set 400 of descriptors is shown here to include a set of vectors 400*a* to 400*f* as the geometric descriptors.

The markers of the edges of the graph forming the set of geometrical descriptors 400 are thus vectors 400*a* to 400*f*. Thus, the distance of each reference position identifiers 340*a* to 340*d* node to the target position identifier 330 is known.

Two adjacent edge markings or edge vectors in such a graph define an angle $\alpha_{1,2}$ according to $$\alpha_{1,2} = ar\cos\left(\frac{\overrightarrow{V2} * \overrightarrow{V1}}{|\overrightarrow{V2}| * |\overrightarrow{V1}|}\right)$$

The direction of the graph may be defined to correspond to the direction of the edge with the maximum length. The degree of the nodes corresponding to the reference position identifiers 340*a* to 340*d* corresponds to the number of reference position identifiers 340*a* to 340*d*.

Figure 4:
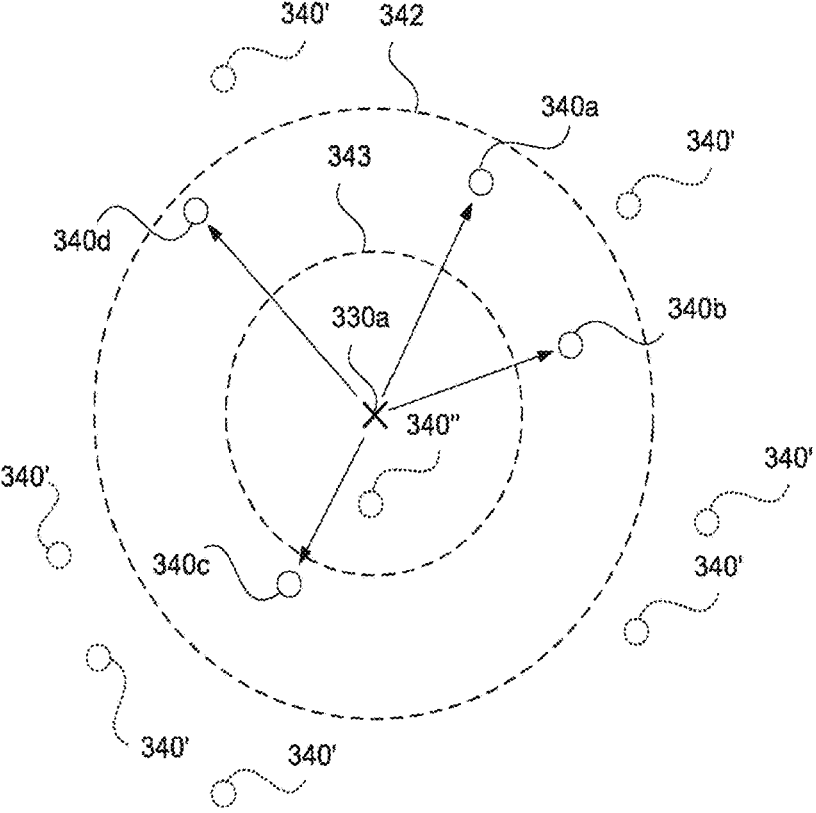
FIG. 4 illustrates categories in defining a geometrical descriptor.

FIG. 4 illustrates categories used in defining a geometrical descriptor according to an embodiment of the present invention. As illustrated, an identified target position identifier 330*a* may be surrounded by a larger plurality of reference position identifiers of which, however, only a subset, the reference position identifiers 340*a* to 340*d*, may be used to form the set of geometrical descriptors 400 while reference position identifiers 340', which are additionally illustrated with dotted lines, are not considered. A decision as to whether include or not include reference position identifiers 340*a* to 340*d*, 340' may particularly be made based on a determination whether these are arranged in a distance range limited by a minimum distance 343 and a maximum distance 342.

That is, the geometric descriptor set 400 may be, according to an embodiment of the present invention, be determined as a vector set or directed graph and/or the position information may be provided in the form of coordinates relative to a reference point determined on the basis of or relating to the vector set or directed graph. As to graphs and further definitions thereof, reference is made to textbooks relating to graph theory. Particularly, a graph according to an embodiment of the present invention may consist of two types of nodes, a node L relating to the region of interest and a plurality of nodes B relating to the reference point position. The number of nodes L in a graph according to an embodiment of the invention is 1. The number of nodes B in graph is, according to an embodiment of the invention greater than 0, and, for being used according to an embodiment of the invention, preferably larger than 2, 3, 4 or 5 and up to 10.

A corresponding graph is, viewed from a first perspective, preferably coherent, all nodes B have a node degree of 1, node L has node degree of B (number of nodes B), the graph is undirected (in general), and the minimum path length between two nodes B is 2. A corresponding graph is, viewed from a second perspective, preferably coherent, nodes B form a cycle, nodes B form an Eulerian circle, the path length is B−1, and the node degree of B is 2. Viewed from a third perspective, a corresponding graph is preferably coherent, all B nodes b have a node degree of 1, node L has node degree B (number of nodes B), the number of nodes L is 1, the number of nodes B is greater than 0, and each edge is marked with the weight of a vector. Finally, and as viewed from a fourth perspective, a corresponding graph is preferably coherent, the nodes B form a cycle, the nodes B form an Eulerian circle, the path length is B−1, the degree of nodes B is 2, and each edge is marked with the weight of the difference vector of the adjacent beads. In an example where the number of nodes B is 6, six paths from node L to nodes B are present and these preferably comprise different lengths. An orientation of a graph maybe defined, in such an embodiment, as the direction of the longest path. Further and alternative definitions may also apply.

FIG. 5 illustrates, as mentioned, a method according to an embodiment of the present invention in the form of a flow diagram which is designated 500. As to the method 500, reference is made to the explanations for FIGS. 2A to 2D above which apply, whether or not method 500 is implemented using a graphical user interface 1000 and to the further explanations of the method steps 510 to 560 of method 500.

With regard to processing and using the geometric descriptors in a further method, such as in an electron microscopy method, which may or may not be form part of embodiments of the present invention, reference is made to the explanations below.

Particularly, providing the position retrieval information includes modifying the geometric descriptors based on an estimate of a shrinkage of the sample in a subsequent process. This embodiment is of particular advantage if an electron microscopy method is used for further examination and/or processing.

The previous explanations were essentially based on the (simplified) assumption that a linear, affine transformation condition between light microscope and electron microscope may be present in which points, straight lines, planes and parallel lines between light microscope and electron microscope are preserved. However, embodiments of the present invention may particularly be used with frozen samples at below −140° C. As a biological cell consists essentially of water, at −140° C. its major constituent is essentially ice. In addition, the cell is covered by an additional ice layer or ice cap. If ice is brought into a vacuum (as in electron microscopy), parts of the ice can sublime directly to the gas phase (freeze-drying effect). Certain parts of the ice are thus removed from the sample by sublimation. Therefore, the cell can shrink in the Z direction (and also in the X, Y directions). This changes the locations of the target position and also of the reference positions. While in a light microscope one can determine the Z position because it can be seen to fluoresce through the ice, this is not possible in electron microscopy because the ice layer present is not sufficiently transparent to electrons in its typical thickness.

In other words, in light microscopy the height of the target position as well as heights of a sample carrier carrying the sample (lowest point) and the ice cap (highest point) can be determined, while in electron microscopy only the heights of the sample carrier (lowest point) and the ice cap (highest point) can be determined. However, according to such an embodiment of the present invention, modifying the geometric descriptors based on an estimate of a shrinkage of the sample in a subsequent process may be based on determining a relative height of the target position in the height span between the sample carrier and the ice cap before performing the subsequent process (in the example explained above in light microscopy which is used for determining the set of (unmodified) geometric descriptors), determining the height of the sample carrier and the ice cap in the subsequent process (such as electron microscopy), and estimating the height of the target position resulting from said shrinkage using the relative height therebetween, which is estimated to be comparable to the relative height in the unshrunk sample.

Expressed in more general terms, modifying the geometric descriptors based on an estimate of a shrinkage of the sample in a subsequent process may include determining a relative height of the target position between a first and a second reference height (in the example explained the sample carrier and the ice cap) for an unshrunk sample wherein the first and second reference heights are particularly optically detected, determining the first and a second reference height in the subsequent process, i.e. for the shrunk sample, and deriving an estimate of the height of the target position from the relative height of the target position determined for the unshrunk sample and the first and a second reference height in the subsequent process, i.e. for the shrunk sample.

In embodiments of the method for examining and/or processing a target position in a microscopic sample using an examination apparatus, position retrieval information for the target position may be provided by a method as described in various embodiments before, and the target position may be retrieved in the examination apparatus on the basis thereof.

In an embodiment of the microscopic examination arrangement comprising a microscopic device and a computing device, the microscopic examination arrangement may particularly adapted to perform a method as explained in embodiments before.

Further details as to the usage of the position information provided according to embodiments of the present invention may be found in a co-filed patent application by the present applicant entitled "Method for retrieving a target position in a microscopic sample in an examination apparatus using position retrieval information, method for examining and/or processing such a target position and means for implementing these methods".

A computer program with program code for performing a method as described before when the computer program is run on a processor is also part of the present invention.

In this connection, FIG. 6 illustrates a computerized microscope system 2000 which may be used in embodiments of the present invention.

The microscope system 2000 may be configured to perform a method described herein. The system 2000 comprises a microscope 2100 and a computer system 2200. The microscope 2100 is configured to take images and is connected to the computer system 2200 by means of a wired or wireless communication path 2300.

The computer system 2200 is configured to execute at least a part of a method described herein. The computer system 2220 and the microscope 2100 may be separate entities but can also be integrated together in one common housing. The computer system 2200 may be part of a central processing system of the microscope 2100 and/or the computer system 2200 may be part of a subcomponent of the microscope 2100, such as a sensor, an actor, a camera or an illumination unit, etc. of the microscope 2100.

The computer system 2200 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 2200 may comprise any circuit or combination of circuits.

In one embodiment, the computer system 2220 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 2200 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems.

The computer system 2200 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 2200 may also include a display device, one or more speakers, and a keyboard and/or controller, which can include a mouse, trackball, touch screen, voice-recognition device, or any other device that permits a system user to input information into and receive information from the computer system 2200.

As illustrated in FIG. 6, computer system 2200 comprises a keyboard and/or a touchpad 2210 adapted to make selections of a screen 2220 on which a graphical user interface 1000 such as extensively explained before may be displayed.

The microscope is shown to comprise, among others, a microscope stand 2110, a stage 2120 on which a sample 100 may be placed, at least one objective or lens 2130, an eyepiece 2140, a tubus 2150, a camera (system) 2160, and an illumination device 2170.

When a user is examining a sample 200 as previously illustrated in connection with FIG. 2D, i.e. when using at least two views orthogonal to each other, such as e.g. the views 1310 and XZ or the views 1310 and YZ, the user may encounter a situation that when zooming in into the view 1310, for example, the views XZ and YZ, which are particularly linked in their corresponding zoom factors to the zoom factor of view 1310, may increasingly contain less information. In other words, recognizable features apparently become more and more spaced apart from each other and the views XZ and YZ, which are itself not enlarged on the user interface 1000 (but each display image parts of a larger zoom factor) are not sufficiently large to cover these recognizable features. Therefore, embodiments of the present invention provide for an adaptation of the sizes of other views to the zoom factor used in a first view. Particularly, the views XZ and YZ may be enlarged when the zoom factor becomes larger and therefore the chance of these views containing meaningful information becomes larger as well. For example, structures surrounding a target feature 101*a* which would be out of view due to a larger zoom factor will become visible when the corresponding sizes of the views on the user interface 1000 are likewise enlarged.

Figures 7A, 7B:
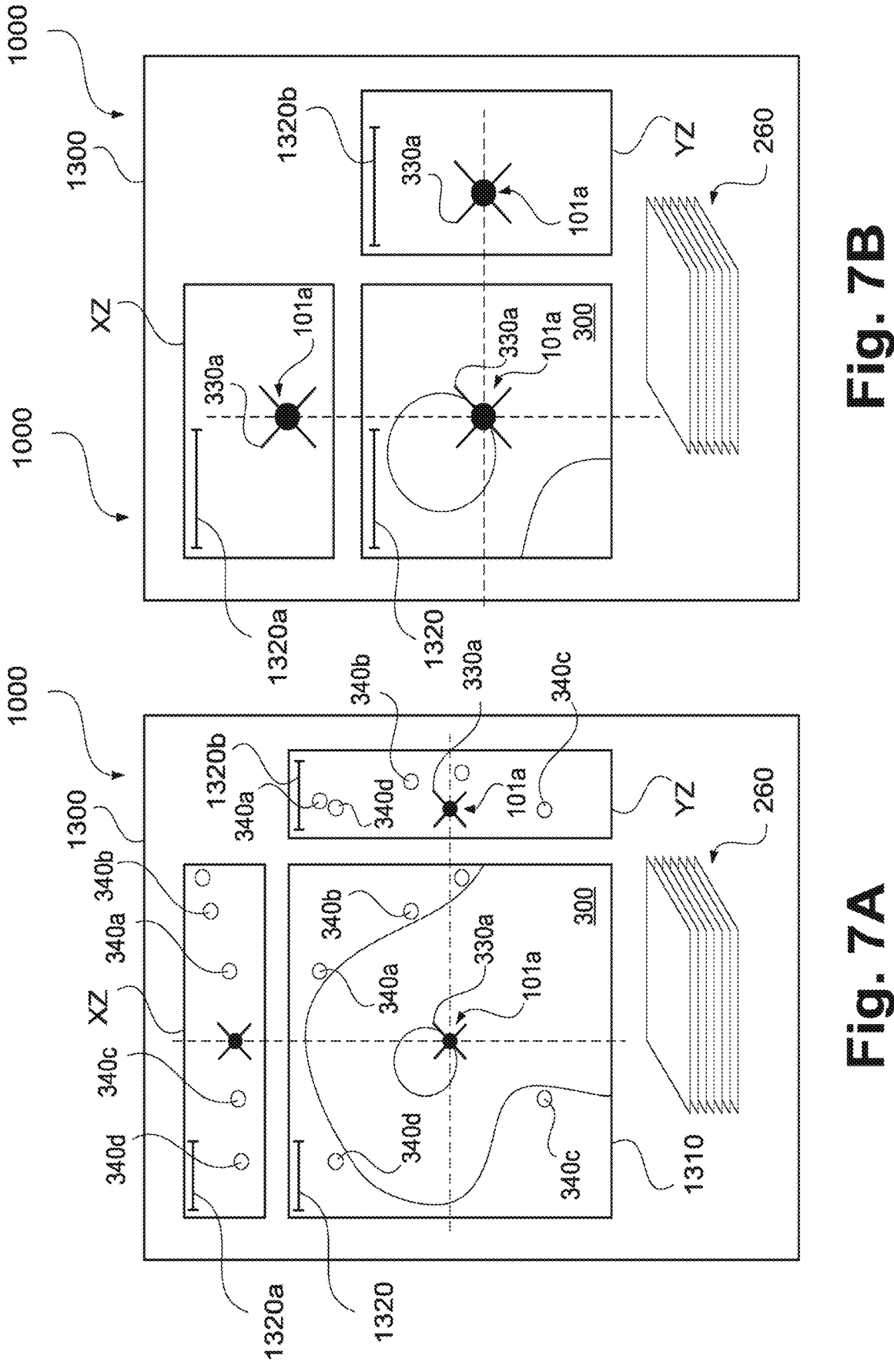
FIGS. 7A and 7B illustrate a user interface of a computerized microscope system.

This is further illustrated in FIGS. 7A and 7B, where FIG. 7A essentially resembles the illustration of the right panel 1300 already illustrated in FIG. 2D. Features of a (graphical) user interface 1000, or the parts thereof illustrated in FIGS. 7A and 7B may, as mentioned, be provided additionally to, or independently from, any further features of embodiments of the present invention, and the parts of the user interface 1000 shown in FIGS. 7A and 7B may be included in other user interfaces. FIG. 7B illustrates a situation wherein the zoom factor of view 1310, i.e. a view in a corresponding viewing area, has changed and the viewing areas XZ and YZ were adapted as a result of this change. According to alternative embodiments, only one of views XZ and YZ may be provided.

More specifically, the user interface 1000 of which parts are illustrated in FIGS. 7A and 7B comprises a first viewing area 1310 configured to display a first view of a three-dimensional image stack 260 in a first layer and a second viewing area XZ for displaying a second view of the three-dimensional image stack in a second layer. In the example shown, the user interface 1000 further comprises a third viewing area, which is viewing area YZ in the example illustrated, and which is configured to display a view of the three-dimensional image stack 260 in a third layer. The second viewing area XZ is arranged above the first viewing area 1310 on the user interface 1000 in the example illustrated and the third viewing area YZ is arranged to the right of the first viewing area 1310 on the user interface 1000. In the example illustrated, the first, the second and the third layer (which are displayed in the first, second and third viewing areas 1310, XZ and YZ) are orthogonal to each other.

The user interface 1000 in the example illustrated is configured to adapt a display size of the second and third viewing areas XZ, YZ on the user interface based on a chosen zoom factor in the first viewing area 1310. As shown in FIG. 7B, this includes an enlargement of the second and third viewing areas XZ and YZ while the first viewing area 1310 may, or may not, be correspondingly reduced in size. Scale bars 1320, 1320*a* and 1320*b* illustrated in FIGS. 7A and 7B each correspond to the same size in the views of the image stack 260 correspondingly shown. As mentioned before, an increase in size may compensate for a loss of information density when an enlargement is performed, i.e. when a zoom factor is changed. Therefore, a user may more easily recognize structures supporting him or her when identifying features such as the target feature 101*a*.

The user interface 1000 may particularly be configured to adapt a visible area of the second and third views in the second and third viewing areas XZ, YZ based on a visible area of the first view in the first viewing area 1310. That is, for example, a horizontal size of the first viewing area 1310 may always be rendered to be the same as the horizontal size of the second viewing area XZ, and these viewing areas 1310 and XZ may be made to cover, in an X direction (e.g. horizontally in the paper plane), the same part of the sample. Likewise, a vertical size of the first viewing area 1310 may always be rendered to the same as the vertical size of the third viewing area YZ and these viewing areas 1310 and YZ may be made to cover, in an Y direction (e.g. vertically in the paper plane), the same part of the sample. As mentioned, same for example, in the first view a range of 100 to 110 μm may be displayed and the same range is also displayed in the second viewing area. A user may therefore navigate more easily in corresponding views.

As also illustrated with the scale bars 1320, 1320*a* and 1320*b* in the first, second and third viewing areas 1310, XZ and YZ, the zoom factors in the corresponding views may be made to correspond to each other.

While the previous explanations referred to a first, a second and a third view 1310, XZ and YZ, embodiments of the present invention may also include a first view and a second view only, wherein the first and the second views may be either two of views 1310, XZ and YZ.

Some or all of the method steps provided according to embodiments of the present invention may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

As used herein the term "and/or" includes any and all combinations of one or more of the associated listed items and may be abbreviated as "/".

Although some aspects have been described in the context of a method, it is clear that these aspects also represent a description of the corresponding device, where a method step or a feature of a method step corresponds to a block or device or a component thereof. Analogously, aspects described in the context of a feature of a corresponding apparatus also represent a description of a method step.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100 microscopic sample
101a-101c target position
200 first digital representation
210 merged image
220 partial images
230a-230c first target position identifier
240 coarse reference position identifiers
250a-250c image stack regions
260 image stack
300 second digital representation
330a second target position identifier
340a-340d reference position identifiers
340' further reference position identifiers
342 maximum distance
343 minimum distance
400 set of geometric descriptors
400a-400f vectors
500 method
510 providing first digital representation
520 specifying first target position identifier
530 acquiring image stack

540 providing second digital representation
550 specifying second target position identifier
560 specifying reference position identifiers
570 determining set of geometric descriptors
1000 graphical user interface
1100 left panel
1200 central panel
1210 overview
1300 right panel
1310, XZ, YZ two-dimensional views
1102-1108 operating elements
2000 microscope system
2100 microscope
2110 microscope stand
2120 stage
2130 objective, lens
2140 eyepiece
2150 tubus
2160 camera (system)
2170 illumination device
2200 computer system
2210 keyboard, touchpad
2220 screen
2300 communication path

The invention claimed is:

1. A method for providing position information for retrieving a target position in a microscopic sample, the method comprising:
   a) providing a first digital representation of the sample or a part of the sample at a first resolution comprising the target position;
   b) specifying a first target position identifier in the first digital representation indicating the target position at the first resolution;
   c) acquiring an image stack in a region of the sample comprising the target position indicated by the first target position identifier, the image stack comprising a plurality of images;
   d) providing a second digital representation at a second resolution higher than the first resolution based on the image stack by performing a deconvolution between pixels of each respective image of the image stack and between pixels of different images of the image stack;
   e) specifying a second target position identifier in the second digital representation indicating the target position at the second resolution;
   f) specifying a plurality of reference position identifiers in the second digital representation indicating positions of optically detectable reference markers at the second resolution; and
   g) determining a set of geometric descriptors describing spatial relations between the second target position identifier and the plurality of reference position identifiers to provide the position information.

2. The method according to claim 1, wherein the target position is a first target position, wherein the method is adapted for providing position information for retrieving one or more further target positions by performing steps b) to g) for each of the one or more further target positions, and wherein the regions of the sample in which the image stacks are acquired for the first and each of the one or more further target positions are disjoint regions.

3. The method according to claim 1, wherein in step f) the plurality of reference position identifiers in a distance larger than a lower distance threshold to the target position and/or in a distance smaller than an upper distance threshold to the target position are specified in the second digital representation.

4. The method according to claim 1, wherein a light microscopic device is used for acquiring the image stack and wherein the second resolution is a digital resolution exceeding an optical resolution of the light microscopic device.

5. The method according to claim 4, wherein providing the second digital representation includes interpolating image pixels within and/or between individual images of the image stack to yield the second resolution.

6. The method according to claim 1, wherein providing the first digital representation comprises computationally merging a plurality of light microscopic images, the plurality of light microscopic images being acquired at least in part at different lateral positions and/or different focus positions.

7. The method according to claim 1, wherein providing the first digital representation comprises displaying at least a part of the first digital representation in a first display region of a graphical user interface rendered by a computing device on a display.

8. The method according to claim 7, wherein specifying the first position identifier comprises receiving and processing a first user input of a user of the computing device, the first user input indicating a position in the first display region of the graphical user interface.

9. The method according to claim 7, wherein providing the second digital representation comprises obtaining a three-dimensional representation based on the image stack and displaying one or a plurality of two-dimensional views of the three-dimensional representation in a second display region of the graphical user interface.

10. The method according to claim 9, wherein specifying the second target position identifier includes receiving and processing a second user input of a user of the computing device, the second user input indicating a position in the second display region of the graphical user interface.

11. The method according to claim 1, further comprising specifying coarse reference position identifiers at the first resolution in the first digital representation indicating coarse positions of visible reference markers in the microscopic sample.

12. The method according to claim 1, wherein the set of geometric descriptors is determined as a vector set or a directed graph, and/or wherein the position information is provided in a form of coordinates relative to a reference point determined based on or relating to the vector set or the directed graph.

13. The method according to claim 1, wherein providing the position information comprises modifying the geometric descriptors based on an estimate of a shrinkage of the sample in a subsequent process.

14. The method according to claim 1, further comprising providing the position information to a processing device for further processing of the sample.

15. A method for examining and/or processing the target position in a microscopic sample using a processing apparatus, wherein the position information for the target position is provided by a method according to claim 1, and wherein the target position is retrieved in the processing apparatus on the basis thereof.

16. A microscopic examination arrangement comprising a microscopic device and a computing device, the microscopic examination arrangement being adapted to perform the method according to claim 1.

17. A non-transitory computer readable medium comprising instructions thereon that, when executed by one or more processors, facilitate performing the method according to claim 1.

* * * * *